US012350204B2

(12) United States Patent
DeBord et al.

(10) Patent No.: US 12,350,204 B2
(45) Date of Patent: Jul. 8, 2025

(54) ARMREST ASSEMBLY

(71) Applicant: Midmark Corporation, Versailles, OH (US)

(72) Inventors: Jeffrey T. DeBord, Worthington, OH (US); Richard L. Lane, Miamisburg, OH (US); Rainer B. Teufel, Worthington, OH (US); Arthur D. Smith, Greenville, OH (US); Brent M. Willey, Anderson, SC (US)

(73) Assignee: Midmark Corporation, Versailles, OH (US)

( * ) Notice: Subject to any disclaimer, the term of this patent is extended or adjusted under 35 U.S.C. 154(b) by 728 days.

(21) Appl. No.: 17/578,568

(22) Filed: Jan. 19, 2022

(65) Prior Publication Data

US 2022/0133573 A1 May 5, 2022

Related U.S. Application Data

(63) Continuation of application No. 16/270,992, filed on Feb. 8, 2019, now Pat. No. 11,253,414.

(60) Provisional application No. 62/629,421, filed on Feb. 12, 2018.

(51) Int. Cl.

| | |
|---|---|
| ***A47C 7/54*** | (2006.01) |
| ***A61G 7/075*** | (2006.01) |
| ***A61G 13/12*** | (2006.01) |
| ***A61G 15/12*** | (2006.01) |
| *A61G 7/05* | (2006.01) |

(52) U.S. Cl.

CPC ....... *A61G 13/1235* (2013.01); *A61G 13/126* (2013.01); *A61G 15/12* (2013.01); *A61G 7/0507* (2013.01); *A61G 7/0508* (2016.11); *A61G 7/0509* (2016.11); *A61G 7/051* (2016.11); *A61G 7/0522* (2016.11); *A61G 7/075* (2013.01)

(58) Field of Classification Search

CPC ...... A47C 7/54; A47C 7/541; A61G 13/1235; A61G 13/126; A61G 7/075

USPC ........................................ 297/411.33, 411.35

See application file for complete search history.

(56) References Cited

U.S. PATENT DOCUMENTS 5,029,941 A * 7/1991 Twisselmann ......... A61B 90/60 297/411.33 X
5,074,501 A * 12/1991 Holtta ..................... B43L 15/00 248/281.11
5,135,190 A * 8/1992 Wilson ..................... A47C 1/03 248/118.1
5,405,109 A * 4/1995 Nordnes ........... A47B 21/0371 248/231.71
5,476,304 A * 12/1995 Gulliver ................ G06F 3/0202 297/411.33 X (Continued)

*Primary Examiner* — Rodney B White

(74) *Attorney, Agent, or Firm* — Frost Brown Todd LLP

(57) ABSTRACT

An armrest assembly is disclosed herein. The armrest assembly includes a main body with a proximal adjustment assembly disposed at a first end and a distal adjustment assembly disposed at a second end. The proximal adjustment assembly provides for adjustment of the main body about a first axis. The distal adjustment assembly provides for adjustment of an arm pad about a second axis as well as a third axis. To prevent damage, a breakaway assembly is provided by the distal adjustment assembly to unlock the arm pad from a raised position and lower it into a lower position in the event a weight applied to the arm pad is beyond a particular weight threshold.

19 Claims, 13 Drawing Sheets

(56) References Cited

U.S. PATENT DOCUMENTS

| | | | | | |
|---|---|---|---|---|---|
| 5,655,814 | A * | 8/1997 | Gibbs | A47C 1/03 297/411.35 X |
| 5,927,815 | A * | 7/1999 | Nakamura | F16C 11/106 297/411.33 X |
| 5,975,469 | A * | 11/1999 | Chen | A47B 21/0371 248/118.1 |
| 6,042,064 | A * | 3/2000 | Hong | A47B 21/0371 248/278.1 |
| 6,347,771 | B1 * | 2/2002 | Lauzon | A47B 21/0371 248/118 |
| 6,478,274 | B1 * | 11/2002 | Oddsen, Jr. | F16M 11/24 |
| 6,619,747 | B2 * | 9/2003 | Ko | A47C 9/025 297/411.31 |
| 6,786,461 | B1 * | 9/2004 | Tsai | B43M 99/00 248/292.12 |
| 7,222,826 | B1 * | 5/2007 | Berglund | A47B 21/0314 248/118 |
| 7,469,964 | B2 * | 12/2008 | Baumann | B60N 2/777 297/411.33 X |
| 7,677,654 | B2 * | 3/2010 | Enberg | B60N 2/753 297/411.32 |
| 9,427,364 | B2 * | 8/2016 | Grant | A61G 5/125 |
| 9,636,268 | B1 * | 5/2017 | Bedillion | A61G 13/1235 |

* cited by examiner

ARMREST ASSEMBLY

BACKGROUND

Patient's needing medical examination often are seated into an examination platform, such as an examination table or examination chair, for assessment by a healthcare provider. When medical examination procedures are conducted, the patient places his or her the arm onto an armrest associated with the examination platform. However, often the placement and orientation of an armrest in a convenient position for a typical armrest is not convenient or conducive for other medical examination procedures such as, for example, the collection of certain physiological data or collection of certain biological samples from a patient. Similarly, certain placements and orientations of an armrest may not be convenient for a patient in a wheelchair during the time in which they are lifted onto the examination platform in a lateral manner, as the armrest may block the lateral side of the examination platform.

Thus, a need exists for an armrest examination platform that is adjustable between various positions to satisfy all the disparate needs of clinician and patient while undergoing examination on the table or chair.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
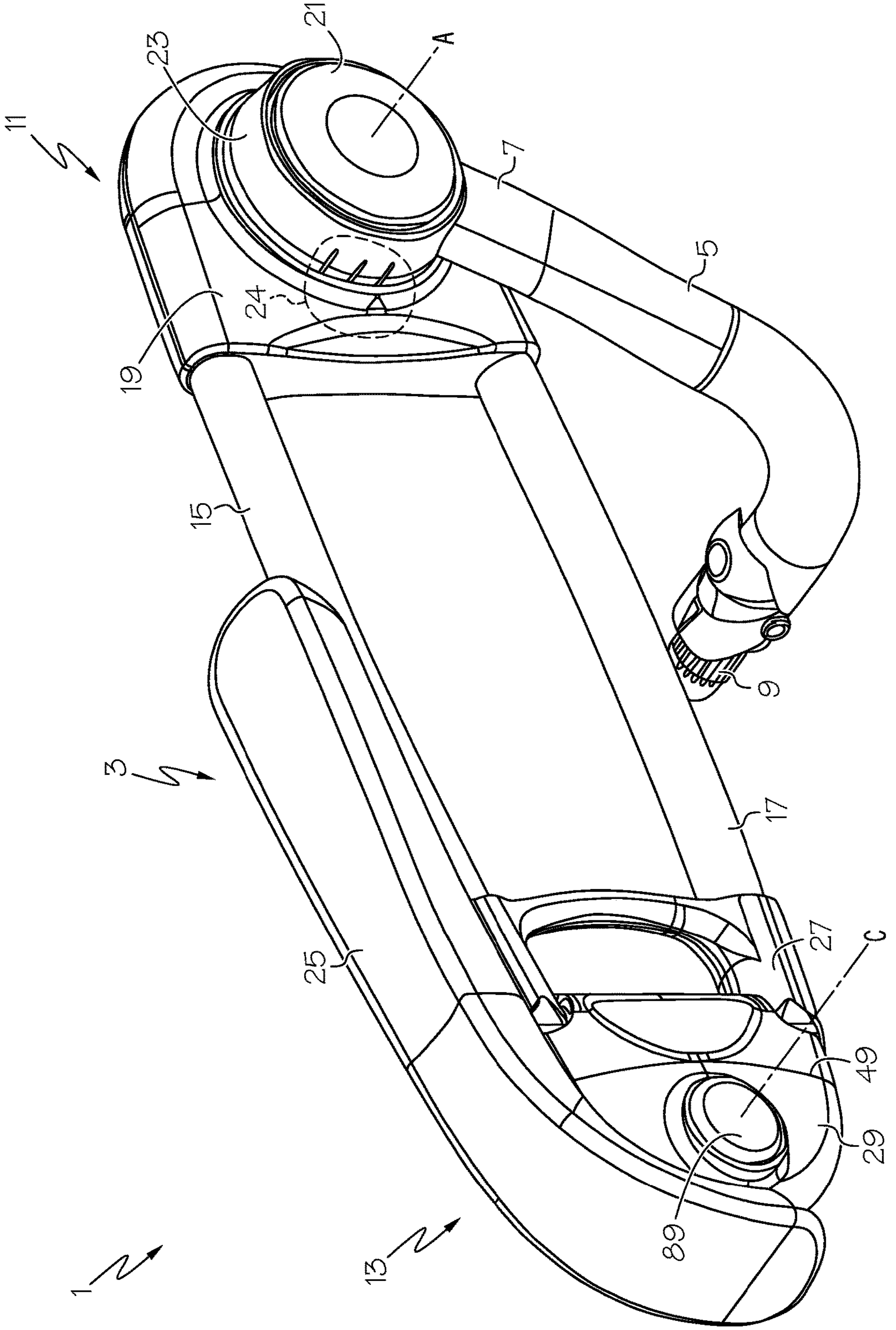
FIG. 1 depicts a side perspective view of an exemplary armrest assembly with an exemplary arm pad in a default position.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of featuring other aspects, all without departing from the invention. Accordingly, the drawings and descriptions should be regarded as illustrative in nature and not restrictive.

It will be appreciated that any one or more of the teachings, expressions, versions, examples, etc. described herein may be combined with any one or more of the other teachings, expressions, versions, examples, etc. that are described herein. The following-described teachings, expressions, versions, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Figure 2:
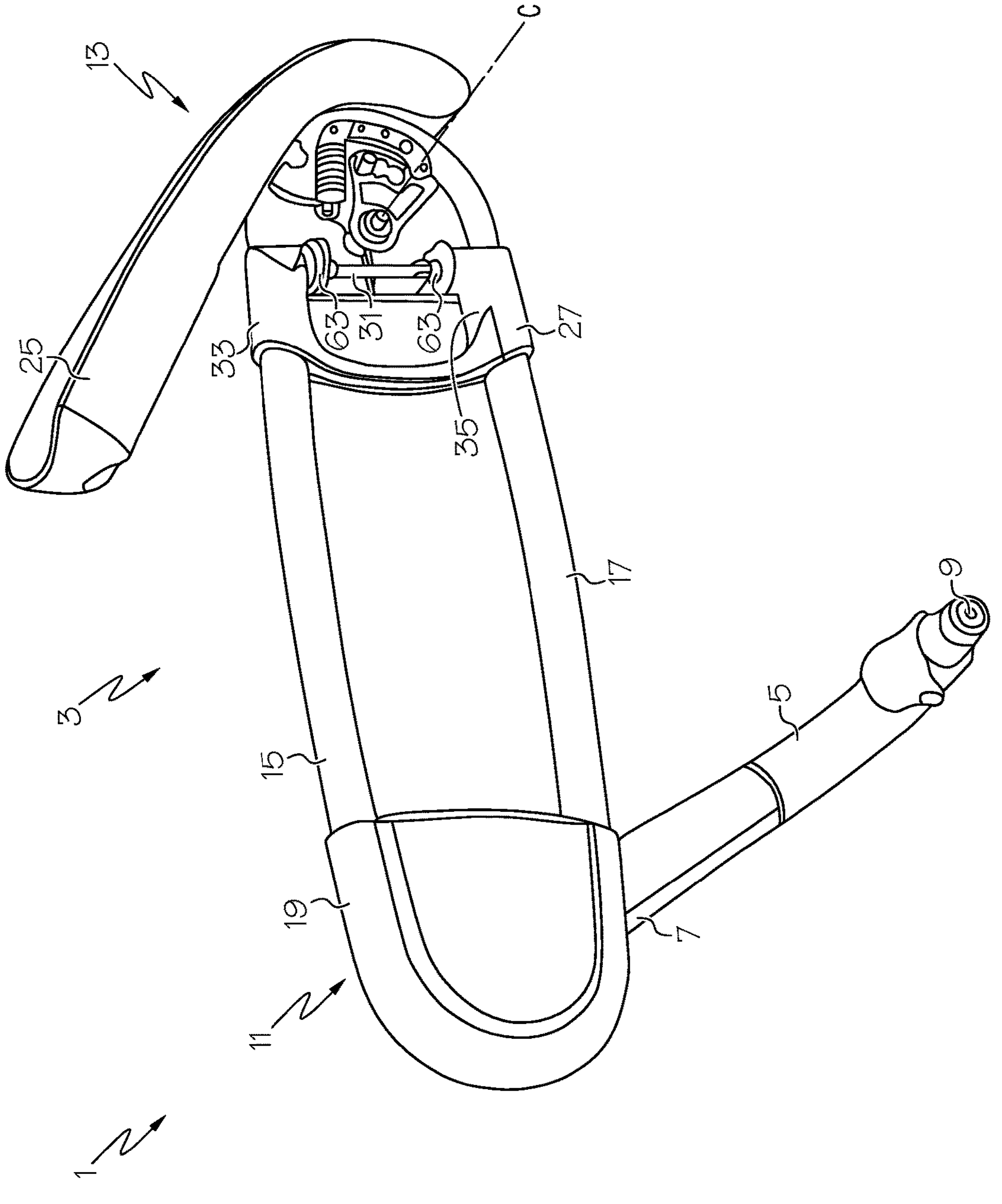
FIG. 2 depicts another side perspective view of the armrest assembly of FIG. 1 with parts cut away and with the arm pad in a non-default position.
Figure 3:
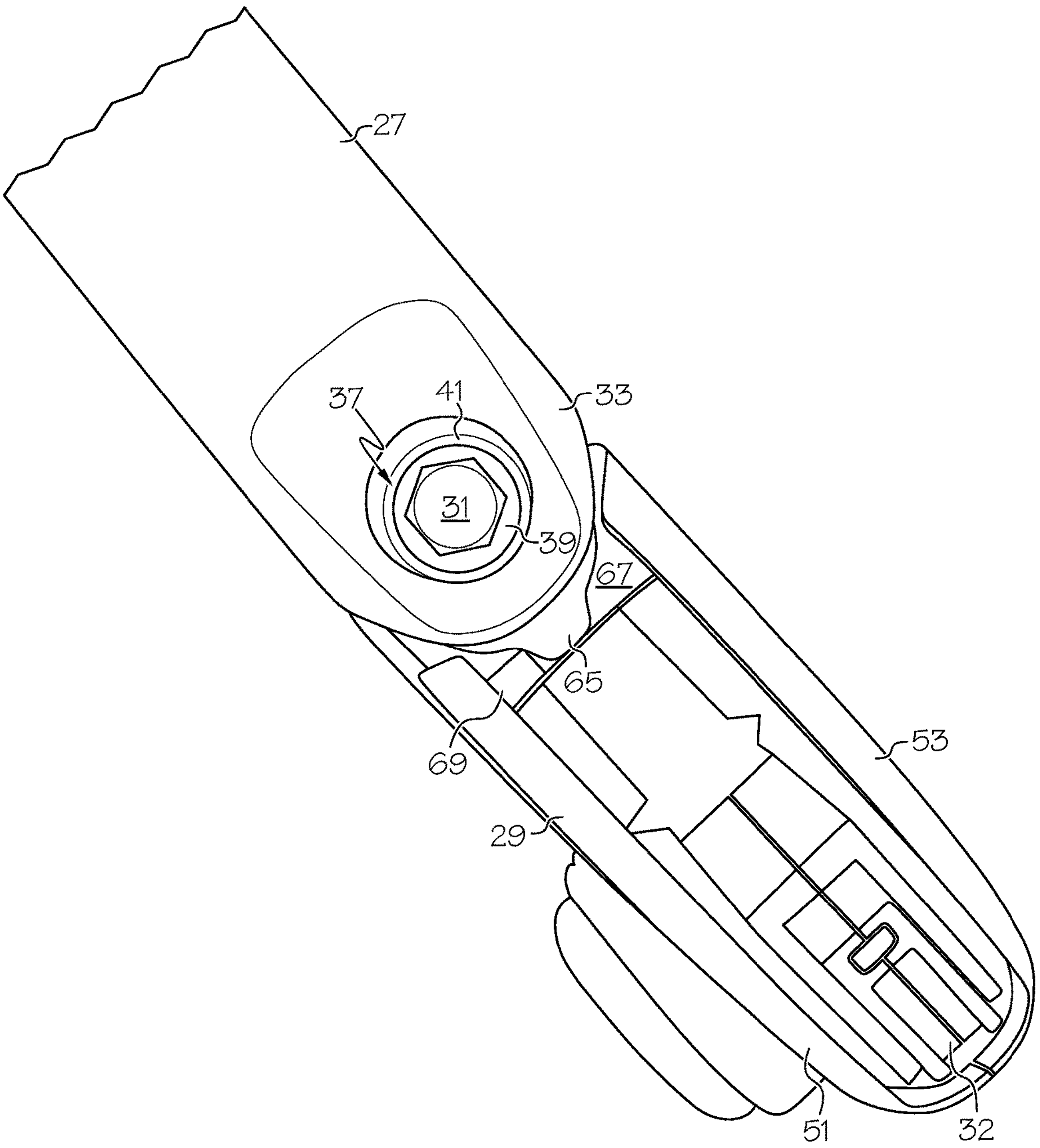
FIG. 3 depicts a top perspective view of the armrest assembly of FIG. 1 with an exemplary swing assembly in a first position.

An exemplary armrest assembly (1) is illustrated in FIGS. 1 and 2 and generally includes a main body (3) and a connector arm (5). Connector arm (5) extends from a first end (7) secured to main body (3) to a second end (9) for use in releasably locking or connecting armrest assembly (1) to an examination platform such as an examination table (not shown) or examination chair (not shown). Main body (3) extends from a proximal adjustment assembly (11) to a distal adjustment assembly (13) and may comprise an upper beam (15) and a lower beam (17). A movable arm pad (25) is connected to distal adjustment assembly (13).

In general, proximal adjustment assembly (11) is configured to move main body (3) about a first axis (Axis A of FIG. 1) between a first main body position and a second main body position. Distal adjustment assembly (13) is configured to move arm pad (25) about a second axis (Axis B of FIG. 7) between a first lateral position and a second lateral position. Distal adjustment assembly (13) is further configured to move arm pad (25) about a third axis (Ax is C of FIG. 1) between a default position and a non-default position. In some versions of armrest assembly (1), the first axis is parallel to the third axis. In some versions of armrest assembly (1), the first axis and/or the third axis is orthogonal to the second axis.

I. Exemplary Proximal Adjustment Assembly

Proximal adjustment assembly (11) facilitates movement of main body (3) about Axis A of FIG. 1 and between the first main body position and the second main body position. In some versions of proximal adjustment assembly (11), the movement may be aligned with various lock points to allow a user to lock in an adjustment about Axis A. In some versions of proximal adjustment assembly (11), pivoting is restricted to a 30-degree angle, with lock points at angle 0, 15, and 30. In still other preferred embodiments of proximal adjustment assembly (11), pivoting is restricted to a plurality of lock points between angles of 0 degrees up to angles of 180 degrees about Axis A, with such lock points being chosen as appropriate for a given application.

Proximal adjustment assembly (11) includes a housing (19) that surrounds the proximal adjustment assembly (11) mechanism as well as the receiving points within that mechanism for receiving the proximal end of upper beam (15) and the proximal end of lower beam (17) and securing these ends therein to securely hold proximal adjustment assembly (11) to the remainder of main body (3). A button (21) is operably connected to adjustment elements disposed internal to housing (19) to allow for the release of proximal adjustment assembly (11) from various lock points and allow for adjustment of main body (3) about Axis A. Button (21) is depressible from a first position (FIG. 1) to a second position (not shown) to release internal adjustment elements from a locked state and allow a user to move main body (3) into a new position relative Axis A. Button (21) is biased to the first position by an internal spring (not shown) or a similar biasing element and therefore when manually released from the second position button (21) will move to the first position and engage the internal adjustment elements to lock main body (3) at the nearest lock point about Axis A.

A collar (23) may be disposed around button (21) to protect and provide an area for movement of button (21) and placement of the biasing element. Collar (23) may be secured to first end (7) of connector arm (5). In some versions of proximal adjustment assembly (11), collar (23) is cast or welded onto first end (7) of connector arm (5).

Indicia (24) may be provided to provide visual feedback to a user regarding the lock points and the current angle of main body (3). For example, indicia (24) such as graduated markings on collar (23) and an arrow or triangle on housing (19) may provide visual feedback to a user regarding the current angle or lock point of main body (3) relative Axis A and connector arm (5).

II. Exemplary Distal Adjustment Assembly

As shown in FIGS. 1-9, distal adjustment assembly (13) includes arm pad (25) and features to allow a user to adjust the position of arm pad (25) about both Axis B between the first lateral position (FIG. 3) and the second lateral position (FIG. 4) and Axis C between the default position (FIG. 1) and the non-default position (FIG. 2). In some versions of distal adjustment assembly (13), arm pad (25) cannot move between the first lateral position and the second lateral position until arm pad (25) is first moved out of the default position.

Distal adjustment assembly (13) may also include a breakaway feature to allow arm pad (25) to move from the non-default or raised position depicted in FIG. 2 to the default position depicted in FIG. 1 if a sufficient amount of weight is applied thereto. The breakaway feature prevents bending or breaking of the various internal elements of armrest assembly (1) in the event that excessive weight is applied to the armrest assembly (1).

Figure 9:
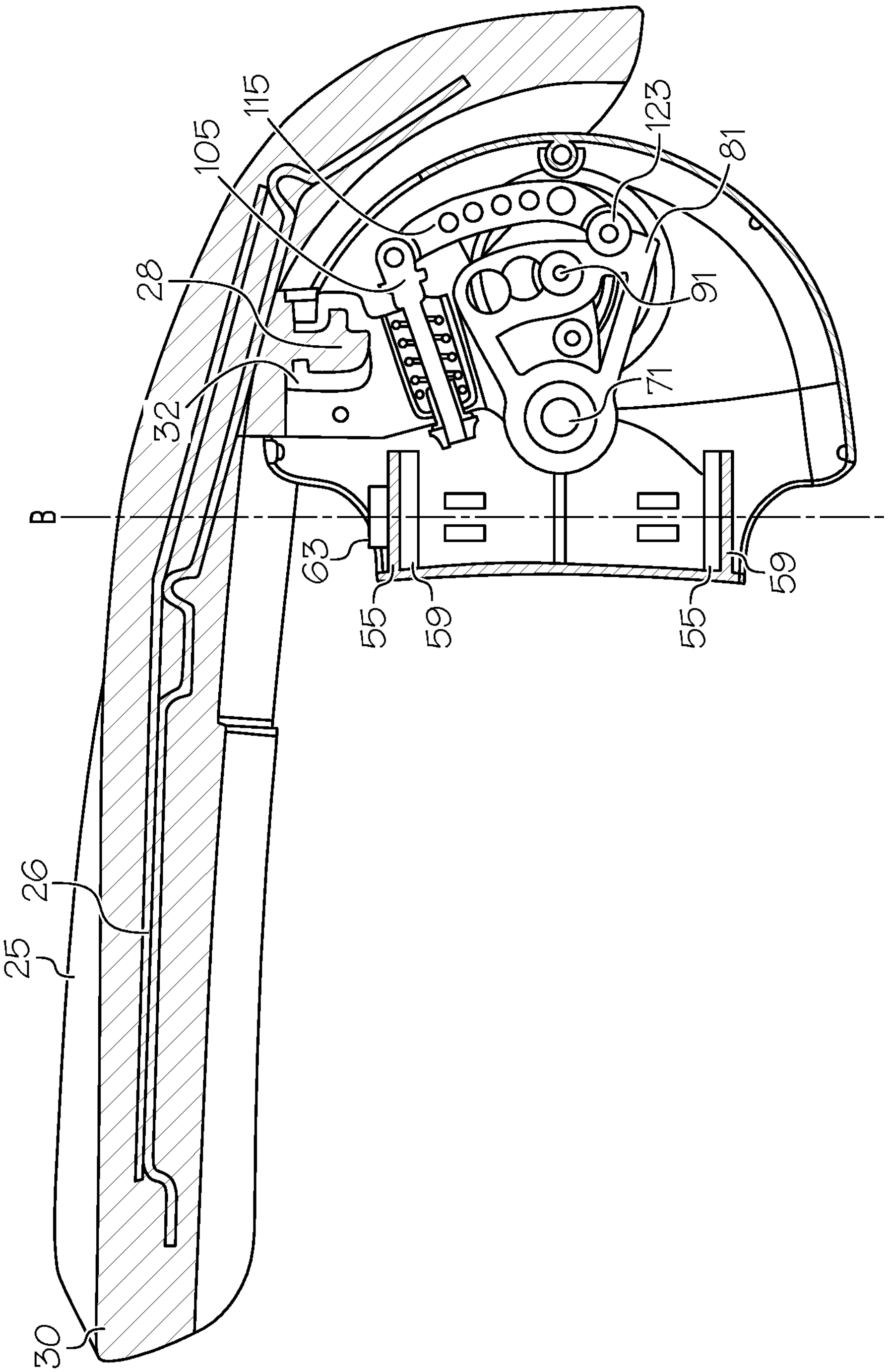
FIG. 9 depicts a cross-sectional view of the swing assembly of FIG. 7 with the internal plate in a first position.

As shown in FIG. 9, arm pad (25) is formed from an internal plate (26) that includes an attachment tang (28). Internal plate (26) and portions of attachment tang (28) are thereafter over molded with an outer layer (30) of a suitable substance such as urethane rubber or other polymeric over mold material. The top surface of outer layer (30) may be scooped or otherwise ergonomically shaped to receive an arm of a patient. Attachment tang (28) is thereafter disposed into a socket (32), shown in FIGS. 3 and 4, and secured therein to attach arm pad (25) to the remaining portion of distal adjustment assembly (13).

A. Exemplary First Adjustment of Arm Pad

Referring to FIGS. 1-6, distal adjustment assembly (13) includes a bracket (27) and a swing assembly (29). Swing assembly (29) is movably coupled to bracket (27) by way of a pin (31) extending through an upper arm (33) of bracket (27), through swing assembly (29), and back into a lower arm (35) of bracket (27). Upper arm (33) defines an upper aperture (37) for receiving an upper post (39) of swing assembly (29) therein. Upper aperture (37) may include an upper liner (41) disposed therein for engagement with upper post (39) as upper post (39) turns inside upper aperture (37). As shown in FIG. 7, lower arm (35) defines a lower aperture (43) for receiving a lower post (45) of swing assembly (29) therein. Lower aperture (43) may include a lower liner (47) disposed therein for engagement with lower post (45) as lower post (45) turns inside lower aperture (43). In certain preferred embodiments, upper and lower liners (41, 47) are press fit into bracket 27 and may include low friction inner bearing surfaces that function to ensure smooth rotation of distal adjustment assembly (13) as it moves about Axis B. By way of example, such low friction inner bearing surfaces can include, but are not limited to, a PTFE lining. In still other embodiments upper and lower liners (41, 47) can themselves be entirely constructed from low friction materials such as brass, high density polyethylene, or other materials that lend themselves to such applications.

Figure 6:
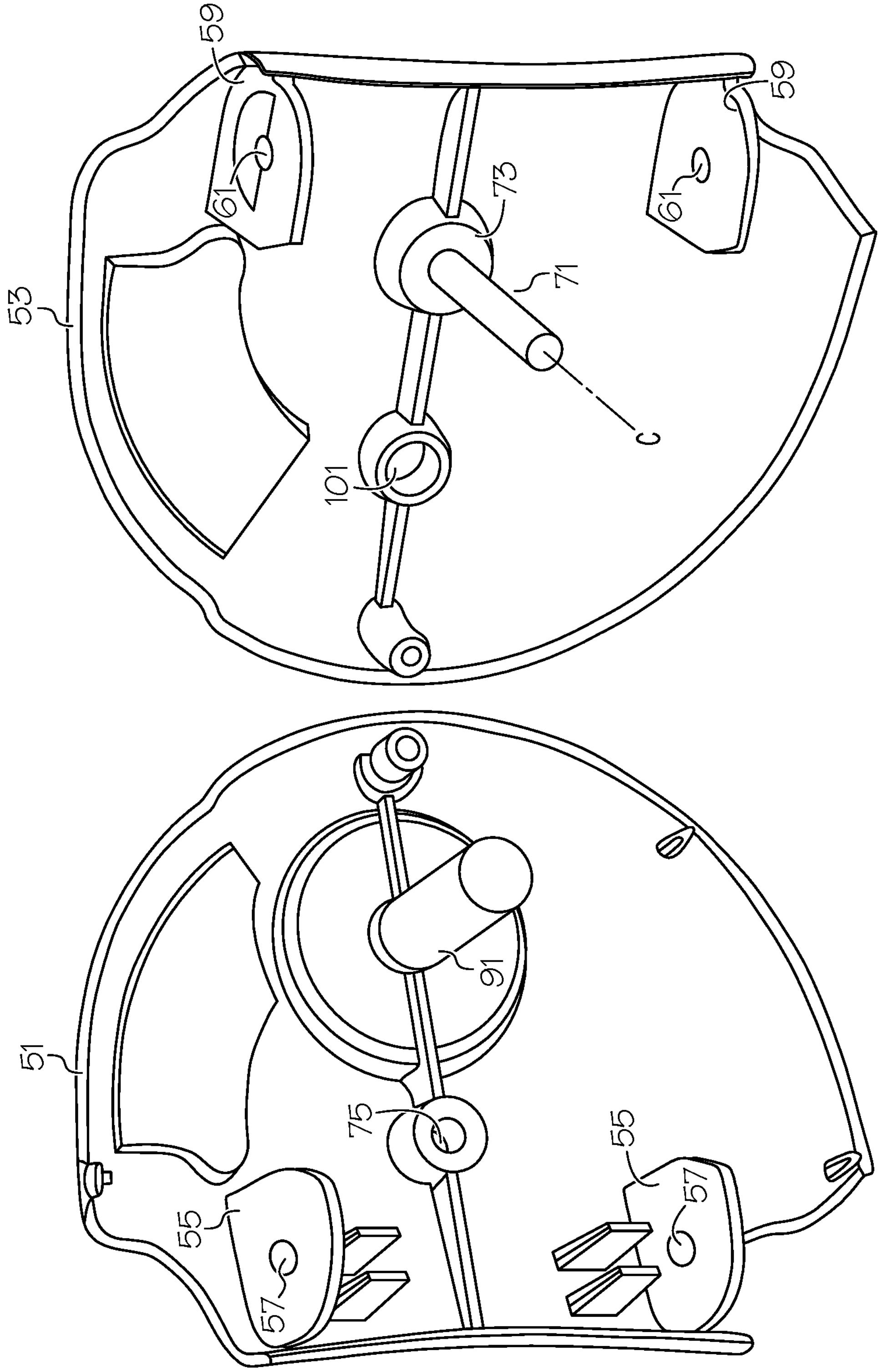
FIG. 6 depicts a perspective view of an exemplary first housing plate and an exemplary second housing plate of the armrest assembly of FIG. 1.
Figure 7:
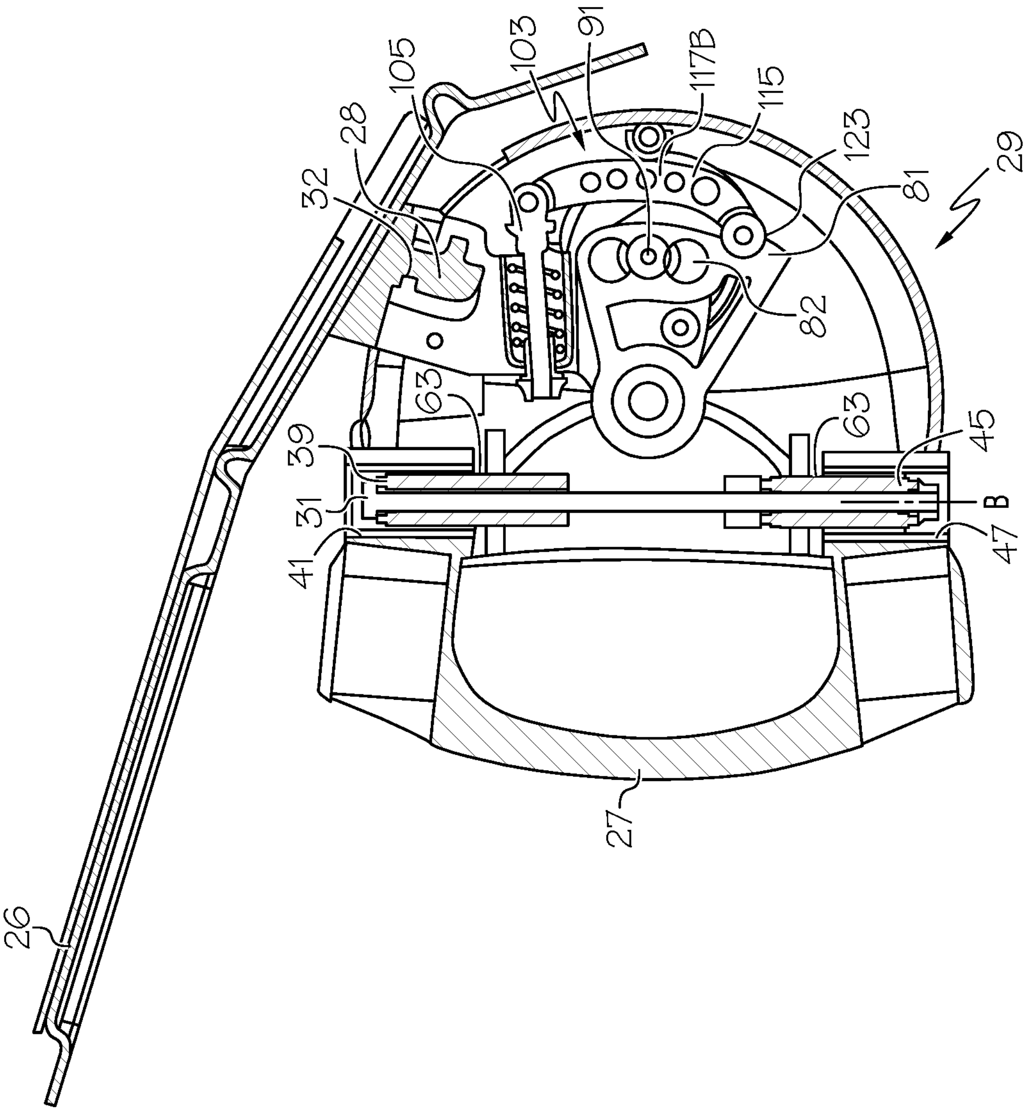
FIG. 7 depicts a cross-sectional view of the swing assembly of FIG. 3 with an exemplary internal plate in a second position.

As shown in FIGS. 1 and 6, swing assembly (29) includes a housing (49). Housing (49) is comprised of a first housing plate (51) and a second housing plate (53). First housing plate (51) includes a pair of alignment fins (55), each defining an aperture (57) therethrough. Similarly, second housing plate (53) includes a pair of alignment fins (59), each defining an aperture (61). As seen in FIG. 9, when first housing plate (53) is brought together with second housing plate (53), each pair of alignment fins (55, 59) abut each other and align apertures (57, 61) to create a channel for pin (31) as pin (31) extends through swing assembly (29).

When swing assembly (29) is coupled with bracket (27) by way of pin (31), the upper pair of alignment fins (55, 59) are disposed proximate upper aperture (37) of upper arm (33) of bracket (27) and the lower pair of alignment fins (55, 59) are disposed proximate lower aperture (43) of lower arm (35) of bracket (27). In some versions of distal adjustment assembly (13), a washer (63) is disposed between each pair of alignment fins (55, 59) and the proximate portion of bracket (27). For example, as shown in FIG. 2, washer (63) may be disposed between upper arm (33) and the upper pair of alignment fins (55, 59) and/or between lower arm (35) and the lower pair of alignment fins (55, 59).

Washer (63) may be a friction bearing formed from a nylon or other polymeric material and put in compression between bracket (27) and swing assembly (29). The frictional and compressed engagement between bracket (27) and swing assembly (29) prevents movement of swing assembly (29) without manual interaction from a user. The frictional engagement allows a user to place arm pad (25) at the desired lateral position, with arm pad (25) remaining in that position without further interaction from the user.

When bracket (27) and swing assembly (29) are connected, pin (31) is coaxial with Axis B. Swing assembly (29) is free to pivot about Axis B within a range of motion from first lateral position (FIG. 3) to second lateral position (FIG.

Figure 4:
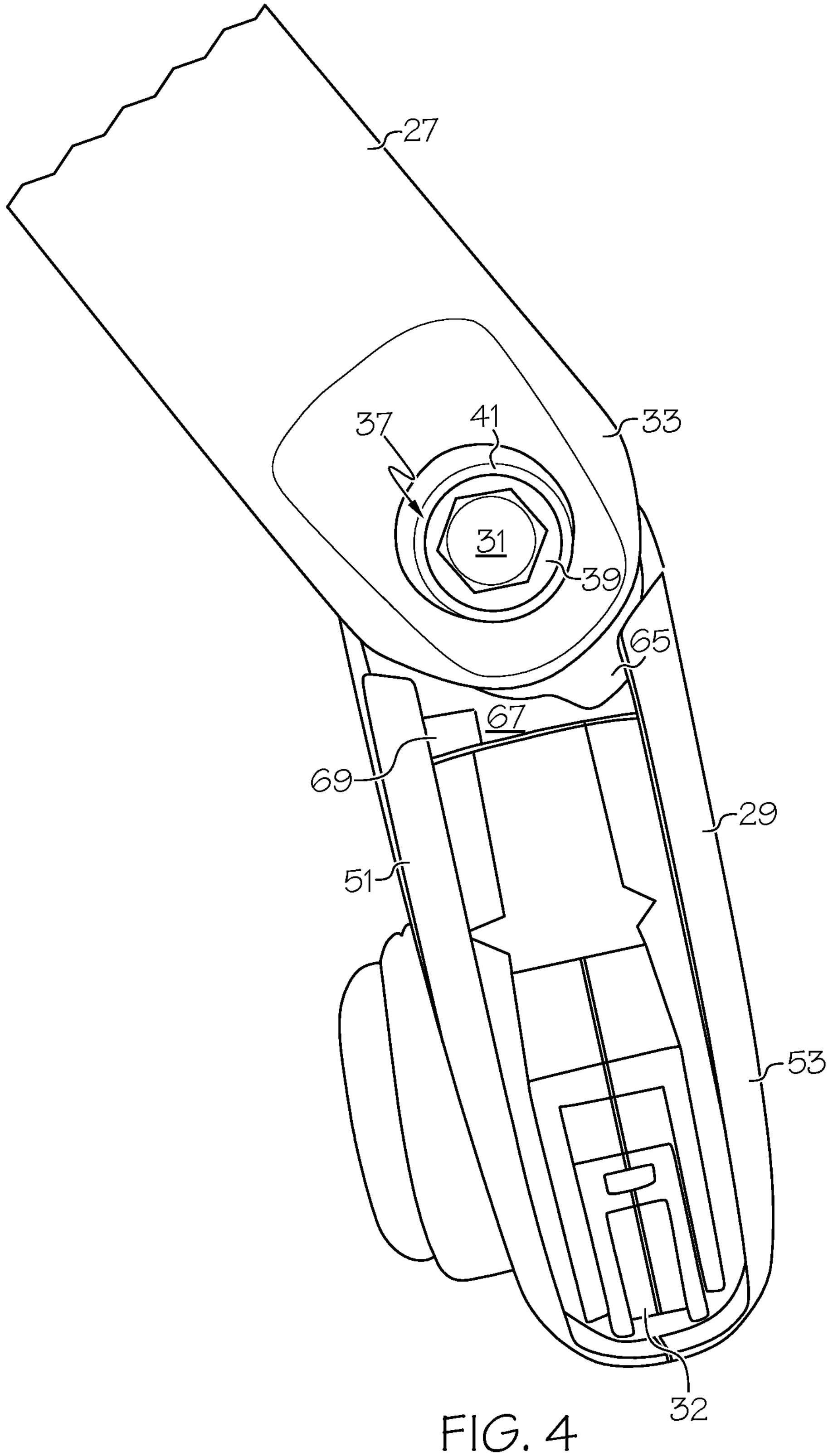
FIG. 4 depicts the swing assembly of FIG. 3 shown in a second position.
Figure 5:
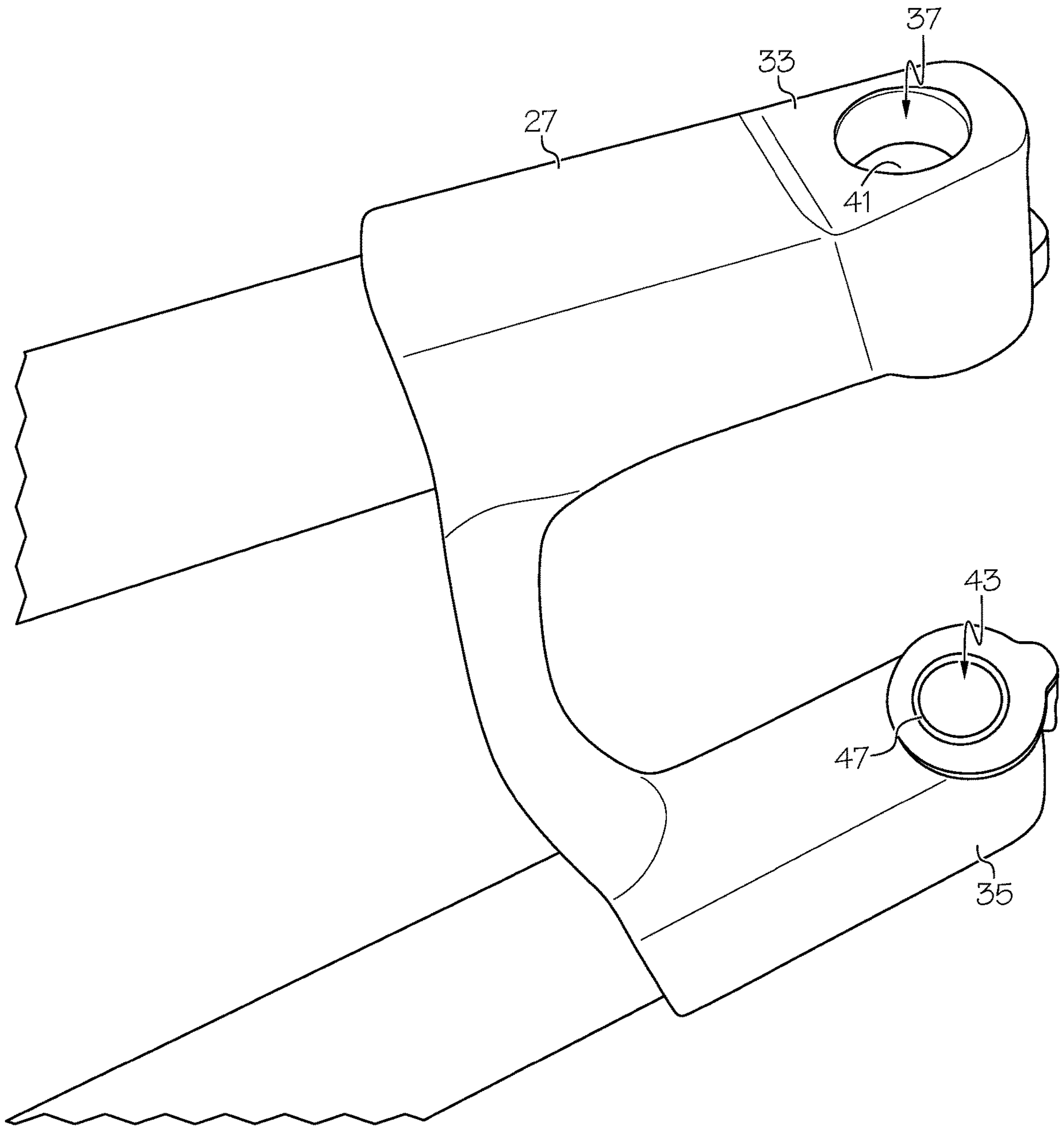
FIG. 5 depicts a perspective view of an exemplary bracket of the armrest assembly of FIG. 1.

4) when swing assembly (29) is coupled with bracket (27). The range of motion may be defined by elements of bracket (27) and/or swing assembly (29). In some versions of distal adjustment assembly (13), a flange (65) extends from one or both of upper arm (33) or lower arm (35). Flange (65) extends into an opening (67) bounded by first housing plate (51) and second housing plate (53). More specifically, a stopper flange (69) extends inwardly from first housing plate (51) to restrict the range of motion of flange (65) within opening (67) and thereby restrict the range of motion of arm pad (25) connected to swing assembly (29) between the first lateral position (FIG. 3) and the second lateral position (FIG. 4). By way of illustration, in certain preferred embodiments of the present invention, the range of arm pad (25) motion is restricted to less than about 45 degrees of rotation about Axis B.

Arm pad (25) is generally aligned and parallel with upper beam (15) in the first lateral position. In the second lateral position, arm pad (25) is pivoted about Axis B such that the proximal portion of arm pad (25) is directed toward the center of the examination platform to which it is attached, and the distal portion is pivoted away from the center of the examination platform. The second lateral position can be utilized to orient a user's hand and arm resting on arm pad (25) away from examination platform to receive care from a healthcare professional. For example, the second lateral position orients a user's forearm toward a healthcare professional who may be beside the examination platform and can thus allow the healthcare professional easier access to the user's arm for conducting phlebotomy, capturing blood pressure, or performing other similar clinical activities.

B. Exemplary Second Adjustment of Arm Pad

Arm pad (25) may be adjusted through a range of motion about Axis C shown in FIGS. 1 and 2 and generally between a default position (FIG. 1) and a non-default position (FIG. 2). In the exemplary version of distal adjustment assembly (13), arm pad (25) is adjustable between three different set orientations. In the first orientation, shown in FIGS. 1 and 9, arm pad (25) is generally parallel with upper beam (15). The first orientation may also be referred to as the default position with arm pad (25) resting on upper beam (15). In some versions of distal adjustment assembly (13), arm pad (25) is scooped at the bottom of outer layer (30) to fit cooperatively against upper beam (15) and therefore prevent arm pad (25) from moving in a lateral direction when in a first orientation. Thus, in some versions of distal adjustment assembly (13), arm pad (25) cannot move between the first lateral position and the second lateral position until arm pad (25) is first moved out of the default position.

The first orientation, shown in FIG. 1, is generally at a 0-degree angle with respect to upper beam (15) of main body (3). In those instances where upper beam (15) is set to generally parallel with the floor, the first orientation is generally at a 0-degree angle with respect to the horizon or floor of the examination room. In the second orientation, shown in FIG. 7, arm pad (25) is raised and rotated to a 15-degree angle with respect to upper beam (15) of main body (3) and potentially the horizon or the floor of the examination room if upper beam (15) is set to a parallel with the floor. In the third orientation, shown in FIG. 8, arm pad (25) is raised and rotated to a 30-degree angle with respect to upper beam (15) of main body (3) and potentially the horizon or the floor of the examination room if upper beam (15) is set to parallel with the floor. While only three orientations about Axis C have been described above, it will be understood that additional or fewer orientations of different or greater angles could be implemented in other embodiments of the present invention.

With reference to FIGS. 2 and 6, Axis C extends through a pivot pin (71). Inside swing assembly (29), pivot pin (71) is coupled with and extends between first housing plate (51) and second housing plate (53). One end of pivot pin (71) is press fit into a recess (73) defined by second housing plate (53). As second housing plate (53) is brought together with first housing plate (51) to form swing assembly (29), the free end of pivot pin (71) is disposed in a recess (75) defined by first housing plate (51). Thus, when first housing plate (51) is secured to second housing plate (53), pivot pin (71) extends firmly and securely therebetween.

Figure 10:
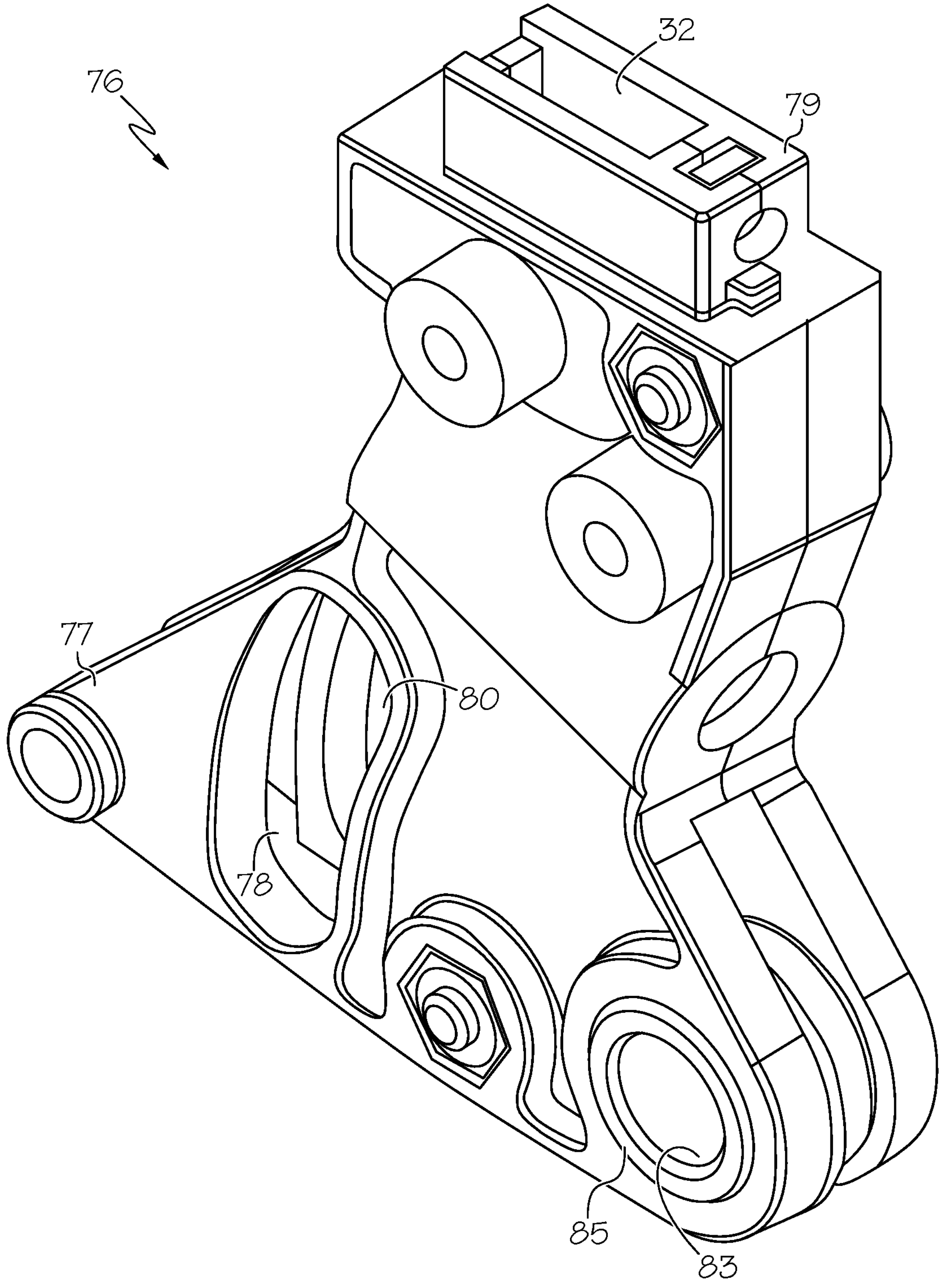
FIG. 10 depicts a perspective view of an exemplary first bearing plate and an exemplary second bearing plate of the armrest assembly of FIG. 1.
Figure 11:
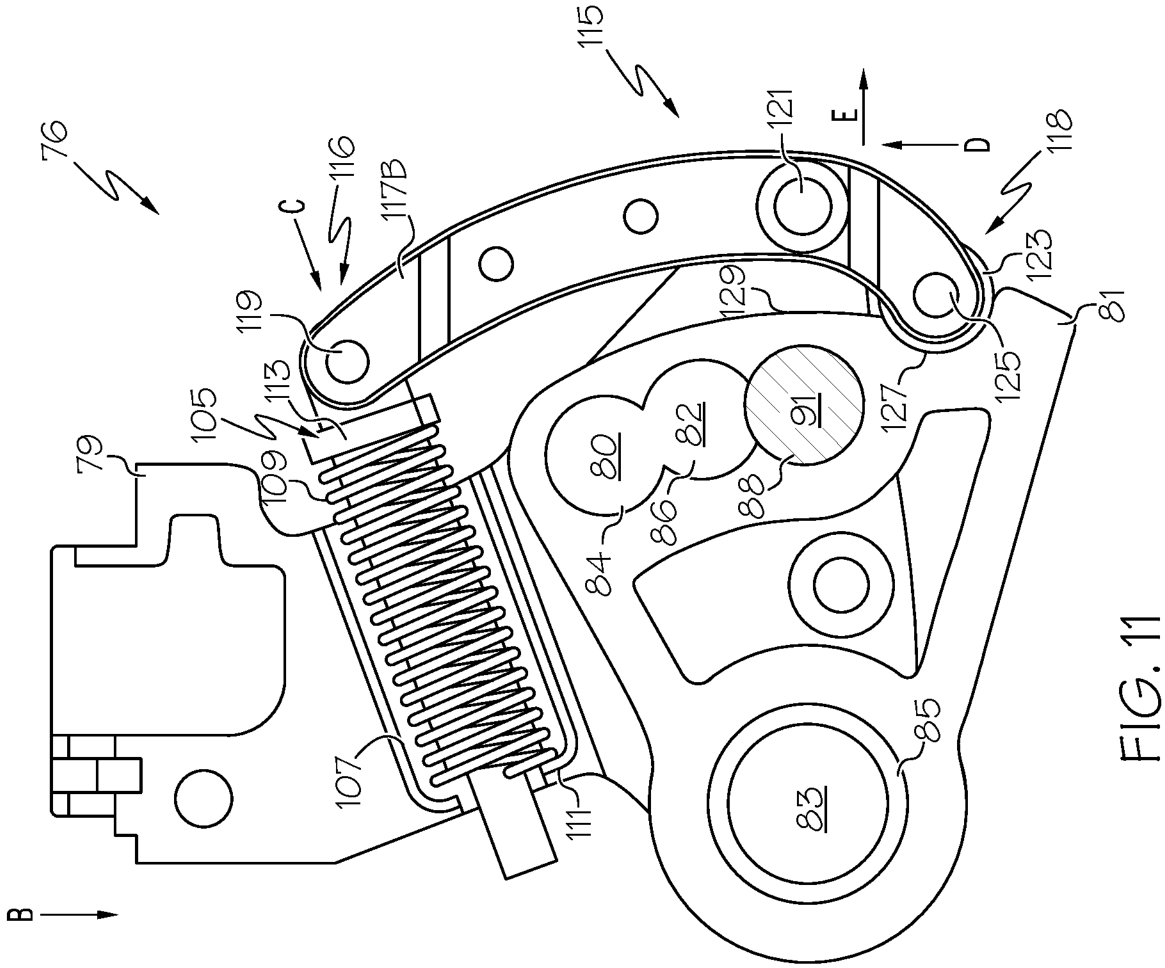
FIG. 11 depicts a cross-sectional view of an exemplary bearing assembly and an exemplary breakaway assembly of the swing assembly of FIG. 7 with the breakaway assembly in a first position.

As shown in FIGS. 10 and 11, swing assembly (29) includes a bearing assembly (76). Bearing assembly (76) defines socket (32) and thus arm pad (25) is connected to bearing assembly (76). Bearing assembly (76) includes a first bearing plate (77) connected to a second bearing plate (79), with a lock plate (81) sandwiched therebetween. First bearing plate (77), lock plate (81), and second bearing plate (79) cooperatively define a bearing (83). Bearing (83) is sized to receive pivot pin (71) therethrough to secure bearing assembly (76) between first housing plate (51) and second housing plate (53) and allow for movement of bearing assembly (76) about Axis C. Inasmuch as arm pad (25) is connected to bearing assembly (76), arm pad (25) indirectly moves about Axis C via bearing assembly (76). As shown in FIG. 10, in some versions of bearing assembly (76), a bearing liner (85) is disposed in bearing (83) to decrease friction and facilitate the movement of bearing assembly (76) about pivot pin (71).

With reference to FIGS. 10 and 11, first bearing plate (77) defines a first adjustment slot (78) and second bearing plate (79) defines a second adjustment slot (80). Lock plate (81) defines a locking slot (82) disposed in line with first adjustment slot (78) and second adjustment slot (80). Locking slot (82) includes three generally circular regions, referred to hereinafter as a first index (84), a second index (86), and a third index (88).

Figure 13:
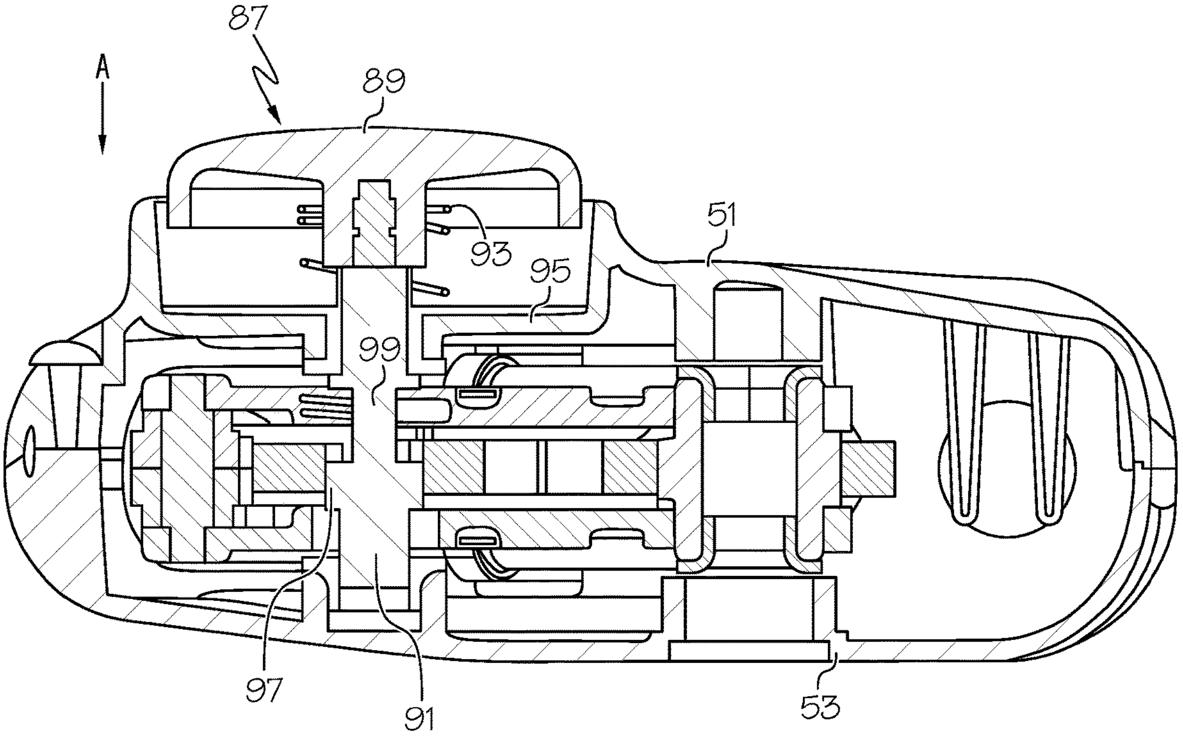
FIG. 13 depicts a cross-sectional top view of the swing assembly of FIG. 7.

As shown in FIGS. 1 and 13, a button assembly (87) extends between first housing plate (51) and the internal pocket defined by swing assembly (29). Button assembly (87) includes a button (89) with a button pin (91) extending therefrom. Button assembly (87) further includes a spring (93) disposed between button (89) and a wall (95) of first housing plate (51). Button (89) is biased away from wall (95) and toward a first position by spring (93). A user may manually press button (89) to move button (89) from the first position to a second position, which in turn moves button pin (91) inside swing assembly (29).

Button pin (91) includes a locking portion (97) and an adjustment portion (99). As shown in FIG. 13, locking portion (97) includes a larger cross-sectional profile with respect to the cross-sectional profile of adjustment portion (99). The cross-sectional profile of locking portion (97) is complementarily sized and configured to abut the periphery of any one of indexes (84, 86, 88) to prevent lock plate (81) from moving about Axis C. The cross-sectional profile of adjustment portion (99) is sized to allow lock plate (81) to move about Axis C when adjustment portion (99) is disposed in any one of the indexes (84, 86, 88). Preventing or allowing lock plate (81) to move about Axis C in turn prevents/allows the entirety of bearing assembly (76) from moving about Axis C, which in turn prevents/allows arm pad (25) from moving about Axis C.

With reference to FIG. 11, button pin (91) extends from button (89) and first housing plate (51), through first adjustment slot (78), locking slot (82), and second adjustment slot (80), to second housing plate (53). Button pin (91) is received within a recess (101) (FIG. 6) defined by second housing plate (53). When locking portion (97) of button pin (81) is disposed in locking slot (82) of lock plate (81), lock plate (81) is prevented from moving about Axis C. When adjustment portion (99) of button pin (81) is disposed in locking slot (82), lock plate (81) is free to move abut Axis C in accordance with the range of motion provided by locking slot (82).

Inasmuch as locking portion (97) of button pin (81) is disposed in locking slot (82) while button (89) is in the first position, when a user presses button (89) to the second position, button pin (91) moves and in turn locking portion (97) moves out of locking slot (82) and adjustment portion (99) moves into locking slot (82). Thus, lock plate (81) is free to move about button pin (91) into a position desired by the user. Locking slot (82) includes first index (84), second index (86), and third index (88) to align the movement of button pin (91) with three corresponding adjustments of bearing assembly (76) about Axis C, which translates to three adjustment selections for arm pad (25).

In operation and assuming upper beam (15) is generally parallel with the floor, to adjust the position of arm pad (25), a user depresses button (89) in the direction of Arrow A (FIG. 13) to move button (89) from the first position to the second position. The movement of button (89) in turn causes locking portion (97) of button pin (91) to move out of lock plate (81) and move adjustment portion (99) of button pin (91) into lock plate (81). With adjustment portion (99) disposed in lock plate (81), arm pad (25) is free to rotate about Axis C via the connection between arm pad (25) and bearing assembly (76). The user thereafter manually raises or lowers arm pad (25) to the desired height relative to first index (84), second index (86), and third index (88). Locking portion (97) is generally the size of the indexes (84, 86, 88), therefore, when the user releases button (89), locking portion (97) moves into lock plate (81) and snaps into the closest index (84, 86, 88), thus locking arm pad (25) in the desired position.

C. Exemplary Breakaway Feature

When adjustment portion (99) of button pin (91) is disposed in lock plate (81) (i.e., as a result of a user depressing button (89)), lock plate (81) is free to move with respect to first housing plate (51) and second housing plate (53), as it rotates about pivot pin 71. During such movement, lock plate (81) generally moves in concert with first bearing plate (77) and second bearing plate (79) to which lock plate (81) is non-permanently connected by cam finger (115) (explained in greater detail below). However, when arm pad (25) is raised from the default position and a weight is applied to arm pad (25) beyond a particular breakaway threshold, lock plate (81) disengages with first bearing plate (77) and second bearing plate (79) to immediately lower arm pad (25) to the default position (FIG. 9). The breakaway feature prevents bending or breaking of any of the internal elements of bearing assembly (76), main body (3), or connector arm (5) due to an excessive weight applied to arm pad (25). For example, a patient may be resting on a medical examination platform such as an examination table or examination chair with armrest assembly (1) connected thereto and arm pad (25) raised from the default position. When the patient presses down upon raised arm pad (25) to get off the medical examination platform, if the patient's weight on arm pad (25) is beyond the set breakaway threshold, arm pad (25) will immediately lower to the default position, resting on upper beam (15). In summary, arm pad (25) is configured to hold steady in the non-default position while the patient rests their arm on arm pad (25), but also configured to break away and retract into the default position if the patient applies too great of weight.

In some versions of armrest assembly (1), the breakaway feature is provided by a breakaway assembly (103) working in conjunction with bearing assembly (76). As shown in FIGS. 7-12, breakaway assembly (103) includes a cam pin (105) disposed in a cam channel (107) cooperatively defined by first bearing plate (77) and second bearing plate (79) of bearing assembly (76), in part via a back wall (111). A spring (109) is disposed about a portion of cam pin (105) and positioned between back wall (111) and a flange (113) of cam pin (105) to encase spring (109) in cam channel (107).

As shown in FIG. 11, breakaway assembly (103) further includes a cam finger (115). Cam finger (115) extends from a first end (116) to a second end (118) and is comprised of two cam plates (117A, 117B). At first end (116), cam finger (115) is connected to cam pin (105) by way of a connector (119) disposed through first end (116) of cam finger (115) and a distal portion of cam pin (105). Inasmuch as connector (119) includes a generally circular cross-sectional profile, first end (116) is free to rotate about connector (119) relative to cam pin (105). Proximate second end (118), cam finger (115) is connected to bearing assembly (76) by way of a connector (121) extending through cam finger (115) and into a portion of first bearing plate (77) and second bearing plate (79). Inasmuch as connector (121) includes a generally circular cross-sectional profile, second end (118) is free to rotate about connector (121) relative to first bearing plate (77) and second bearing plate (79) in particular and bearing assembly (76) in general.

A roller element (123) is disposed between cam plates (117A, 117B) at the extreme distal portion of second end (118). Roller element (123) is held by a connector (125) extending through both cam plates (117A, 117B) and roller element (123). Roller element (123) is free to roll about connector (125) relative to cam plates (117A, 117B). Roller element (123) may be disposed in a catch recess (127) defined by lock plate (81) or may ride or roll along a surface (129) of lock plate (81).

Figure 8:
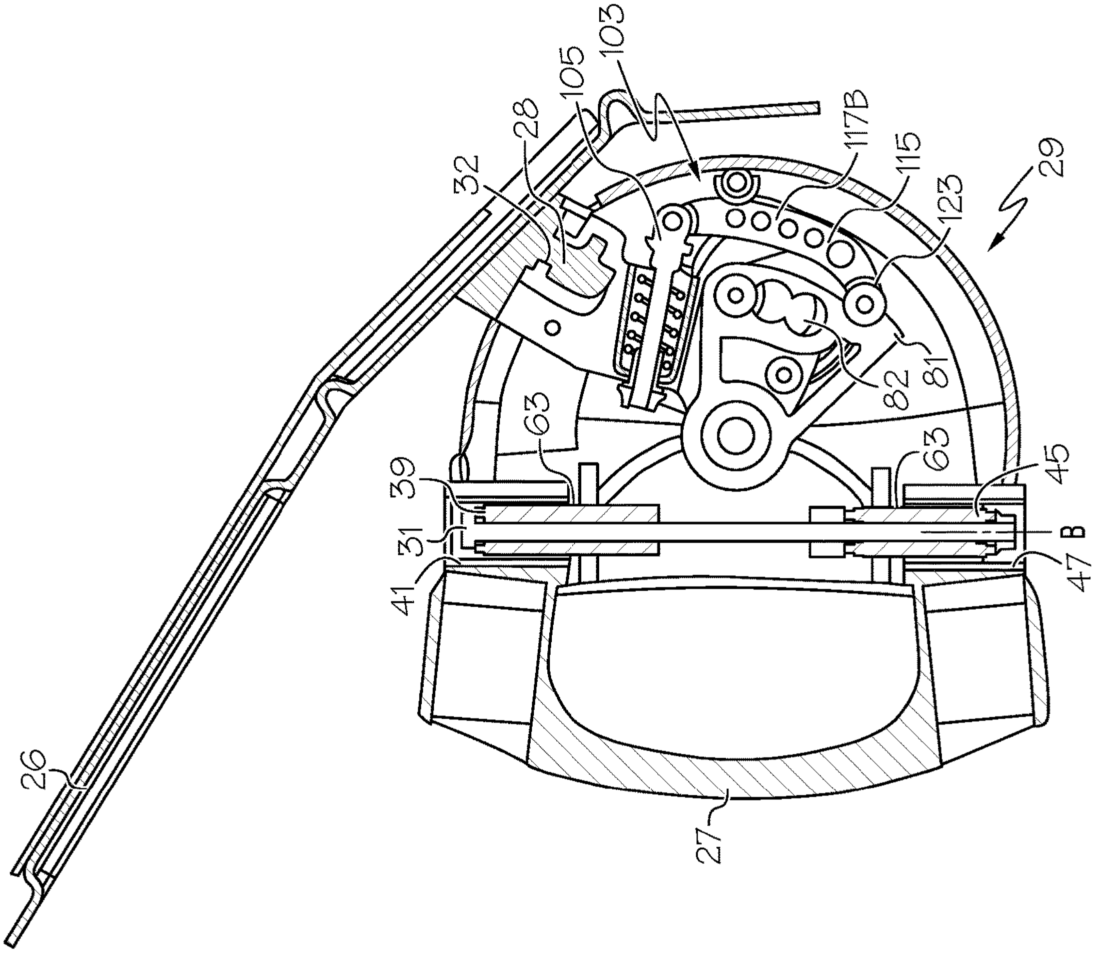
FIG. 8 depicts a cross-sectional view of the swing assembly of FIG. 7 with the internal plate in a third position.
Figure 12:
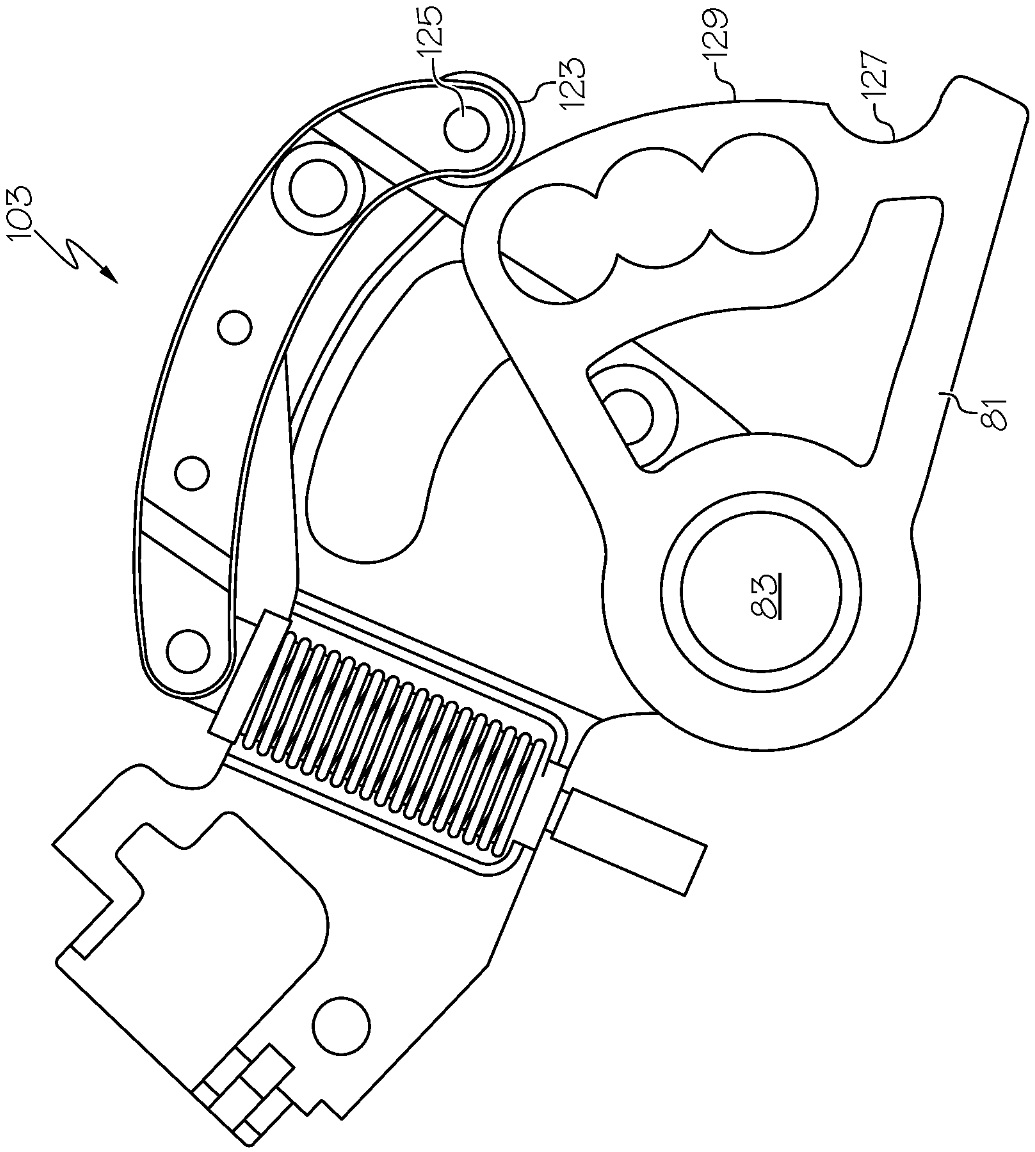
FIG. 12 depicts the bearing assembly and breakaway assembly of FIG. 11 with the breakaway assembly in a second position.

With reference to FIGS. 8, 11, and 12, when arm pad (25) is raised from the default position by a user and weight is applied to arm pad (25), a force is generated by this weight generally in the direction of Arrow B (FIG. 11). The force generated in the direction of Arrow B will cause the bearing assembly (76) to be biased toward rotational motion about Axis C (FIG. 2) and, as the force is translated through the bearing assembly (76), will result in roller element (123) being biased to exit catch recess (127) generally in the direction of Arrow D by rising out of catch recess (127) and subsequently traveling along surface 129. Thus, if sufficient weight is applied to arm pad, spring (109) will experience compression forces as first end (116) of cam finger (115) is pressed in the direction of Arrow C toward back wall (111). As first end (116) moves in the direction of Arrow C, cam finger (115) rotates about connector (121) and second end (118) briefly travels generally in the direction of Arrow E as roller element (123) rises out of catch recess (127) before then traveling generally in the direction of Arrow D as roller element (123) moves along surface (129). Stated differently, upon the weight of the user on arm pad (25) reaching a breakaway threshold, roller element (123) will overcome the force applied by spring (109) keeping the roller element (123) in the catch recess (127) and will rise out of catch recess (127) and ride up onto surface (129). The release of roller element (123) from catch recess (127) releases the connection between lock plate (81) and first bearing plate (77) and second bearing plate (79), allowing lock plate (81) to remain stationary with respect to button pin (91) while first bearing plate (77) and second baring plate (79) moves independently from lock plate (81). The movement of first and second bearing plates (77, 79) relative to lock plate (81) frees arm pad (25) to move from the raised non-default position to the default position abutting upper beam (15). Once retracted to the default position, the weight of the user is directed to main body (3) rather than bearing assembly (76), thereby preventing damage to the components of bearing assembly (76).

With respect to spring (109) and the force applied by spring (109) to maintain the roller element (123) in the catch recess (127) during normal use of armrest, it will be understood that the breakaway threshold of the breakaway feature can be modulated by modulating the value of the spring constant of spring (109). It will further be understood that the breakaway threshold of the breakaway feature can also be modulated by modulating the characteristics of the roller element (123) and the catch recess (127).

To reset bearing assembly (76) such that lock plate (81) moves in conjunction with first and second bearing plates (77, 79), the user manually moves arm pad (25) back into the position prior to the breakaway. The movement rolls roller element (123) along surface (129) toward catch recess (127), ultimately moving roller element (123) back into catch recess (127). Once roller element (123) is disposed in catch recess (127), lock plate (81) and first and second bearing plates (77, 79) move in concert.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An armrest assembly comprising: (a) a main body extending from a first end to a second end; (b) a proximal adjustment assembly disposed at the first end of the main body, wherein the proximal adjustment assembly is configured to rotate the main body about a first axis; (c) a distal adjustment assembly disposed at the second end of the main body; (d) an arm pad connected to the distal adjustment assembly; wherein the distal adjustment assembly is configured to rotate the arm pad about a second axis; and wherein the distal adjustment assembly is configured to rotate the arm pad about a third axis.

Example 2

The armrest assembly or method of any of the subsequent Examples, wherein the first axis is parallel to the third axis.

Example 3

The armrest assembly or method of the previous or subsequent Examples, wherein the second axis is orthogonal to the first axis and the third axis.

Example 4

The armrest assembly or method of any of the previous or subsequent Examples, wherein the second axis is orthogonal to the third axis.

Example 5

The armrest assembly or method of any of the previous or subsequent Examples, wherein the distal adjustment assembly includes a bearing assembly coupled with a breakaway assembly, wherein the arm pad is connected to the bearing assembly.

Example 6

The armrest assembly or method of any of the previous or subsequent Examples, wherein the breakaway assembly is configured to unlock movement of the arm pad in response to a weight on arm pad above a weight threshold.

Example 7

The armrest assembly or method of any of the previous or subsequent Examples, wherein the breakaway assembly includes a spring, wherein the spring is associated with the weight threshold.

Example 8

The armrest assembly or method of any of the previous or subsequent Examples, wherein the breakaway assembly includes a cam finger movable between a first position and a second position, wherein movement of the arm pad is locked in the first position, wherein movement of the arm pad is unlocked in the second position.

Example 9

The armrest assembly or method of any of the previous or subsequent Examples, wherein the bearing assembly includes a lock plate, wherein the lock plate defines a catch recess and a surface, wherein the cam finger abuts the catch recess in the first position, wherein the cam finger abuts the surface in the second position.

Example 10

The armrest assembly or method of any of the previous or subsequent Examples, wherein the cam finger includes a roller element, wherein the roller element abuts the catch recess in the first position, wherein the roller element abuts the surface in the second position.

Example 11

A method comprising: (a) moving a main body of an armrest assembly about a first axis; (b) moving an arm pad of the armrest assembly about a second axis; and (c) moving the arm pad of the armrest assembly about a third axis.

Example 12

The armrest assembly or method of any of the previous or subsequent Examples, further comprising: (a) moving the arm pad about the third axis from a default position to a non-default position; and (b) locking the arm pad in the non-default position, wherein locking the arm pad in the non-default position prevents the arm pad from moving to the default position.

Example 13

The armrest assembly or method of any of the previous or subsequent Examples, further comprising: (a) receiving a first force on the arm pad in the non-default position, wherein the first force is greater than a force threshold; and (b) in response to receiving the first force on the arm pad in the non-default position, unlocking the arm pad.

Example 14

The armrest assembly or method of any of the previous or subsequent Examples, further comprising: (a) receiving a second force on the arm pad in the non-default position, wherein the second force is less than the force threshold; and (b) in response to receiving the second force on the arm pad in the non-default position, maintaining the lock of the arm pad.

Example 15

An armrest assembly configured to releasably lock with an examination platform, the armrest assembly comprising: (a) a main body extending from a first end to a second end; (b) a proximal adjustment assembly disposed at the first end of the main body, wherein the proximal adjustment assembly is configured to selectively move the main body between a first main body position and a second main body position; (c) a distal adjustment assembly disposed at the second end of the main body; (d) an arm pad selectively movable between a default position and a non-default position, wherein the arm pad is connected to the distal adjustment assembly; wherein the distal adjustment assembly is configured to selectively move the arm pad between a first lateral position and a second lateral position when the arm pad is in the non-default position; and wherein the distal adjustment assembly is prevented from moving the arm pad between the first lateral position and the second lateral position when the arm pad is in the default position.

Example 16

The armrest assembly or method of any of the previous or subsequent Examples, wherein the proximal adjustment assembly comprises a proximal button configured to selectively move between a first proximal button position and a second proximal button position, wherein the main body is free to move between the first main body position and the second main body position when the proximal button is in the first proximal button position, wherein the main body is prevented from moving between the first main body position and the second main body position when the proximal button is in the second proximal button position.

Example 17

The armrest assembly or method of any of the previous or subsequent Examples, further comprising a connector arm having a first end and a second end, wherein the first end is secured to the proximal adjustment assembly, wherein the second end is configured to releasably lock with an examination platform.

Example 18

The armrest assembly or method of any of the previous or subsequent Examples, wherein the distal adjustment assembly comprises a distal button configured to selectively move between a first distal button position and a second distal button position, wherein the arm rest is free to move between the first lateral position and the second lateral position when the distal button is in the first distal button position, wherein the arm rest is prevented from moving between the first lateral position and the second lateral position when the distal button is in the second distal button position.

Example 19

The armrest assembly or method of any of the previous or subsequent Examples, wherein the main body comprises an upper beam extending from the proximal adjustment assembly to the distal adjustment assembly, wherein the main body comprises a lower beam extending from the proximal adjustment assembly to the distal adjustment assembly.

Example 20

The armrest assembly or method of any of the previous Examples, wherein the arm pad abuts the upper beam in the default position.

IV. Miscellaneous

It should be understood that any of the examples described herein may include various other features in addition to or in lieu of those described above. By way of example only, any of the examples described herein may also include one or more of the various features disclosed in any of the various references that are incorporated by reference herein.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various versions of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A method comprising:
(a) moving a main body of an armrest assembly about a first axis;
(b) moving an arm pad of the armrest assembly about a second axis;
(c) moving the arm pad of the armrest assembly about a third axis;
(d) moving the arm pad about the third axis from a default position to a non-default position; and
(e) locking the arm pad in the non-default position, wherein locking the arm pad in the non-default position prevents the arm from moving to the default position.

2. The method of claim 1, further comprising:
(a) receiving a first force on the arm pad in the non-default position, wherein the first force is greater than a force threshold; and
(b) in response to receiving the first force on the arm pad in the non-default position, unlocking the arm pad.

3. The method of claim 2, further comprising:
(a) receiving a second force on the arm pad in the non-default position, wherein the second force is less than the force threshold; and
(b) in response to receiving the second force on the arm pad in the non-default position, maintaining the lock of the arm pad.

4. The method of claim 3, further comprising disposing a spring within the armrest assembly, wherein the spring is associated with the force threshold.

5. The method of claim 1, wherein the arm pad abuts the main body in the default position.

6. The method of claim 1, wherein the first axis is parallel to the third axis.

7. The method of claim 6, wherein the second axis is orthogonal to the first axis and the third axis.

8. The method of claim 1, wherein the second axis is orthogonal to the third axis.

9. A method comprising:
(a) rotating, by way of a proximal adjustment assembly, a main body of an armrest assembly about a first axis, wherein the proximal adjustment assembly is disposed at a first end of the main body;
(b) rotating, by way of a distal adjustment assembly, an arm pad of the arm rest assembly about a second axis, wherein the distal adjustment assembly is disposed at a second end of the main body; and
(c) rotating, by way of the distal adjustment assembly, the arm pad about a third axis and between a default position and a non-default position.

10. The method of claim 9, wherein the arm pad abuts the main body in the default position.

11. The method of claim 9, wherein the first axis is parallel to the third axis.

12. The method of claim 9, wherein the second axis is orthogonal to the third axis.

13. The method of claim 9, wherein the second axis is orthogonal to the first axis and the third axis.

14. The method of claim 9, further comprising preventing the arm pad from moving about the second axis when the arm pad is in the default position.

15. A method comprising:
(a) rotating, by way of a proximal adjustment assembly, a main body of an armrest assembly between a first main body position and a second main body position, wherein the proximal adjustment assembly is disposed at a first end of the main body;
(b) rotating, by way of the distal adjustment assembly, the arm pad between a first lateral position and a second lateral position; and
(c) rotating, by way of a distal adjustment assembly, an arm pad of the arm rest assembly between a default position and a non-default position.

16. The method of claim 15, further comprising abutting the arm pad against the main body when the arm pad is in the default position.

17. The method of claim 15, further comprising preventing the arm pad from rotating out of the first lateral position when the arm pad is in the default position.

18. The method of claim 15, further comprising:
(a) rotating the arm pad from the default position to the non-default position; and
(b) locking the arm pad in the non-default position, wherein locking the arm pad in the non-default position prevents the arm from moving to the default position.

19. The method of claim 18, further comprising:
(a) applying a force on the arm pad locked in the non-default position;
(b) determining whether the force is greater than a force threshold associated with the armrest assembly;
(c) in response to determining the force is greater than the force threshold, unlocking the arm pad; and
(d) in response to determining the force is not greater than the force threshold, maintaining the locking of the arm pad.

* * * * *